United States Patent Office 3,461,672
Patented Aug. 19, 1969

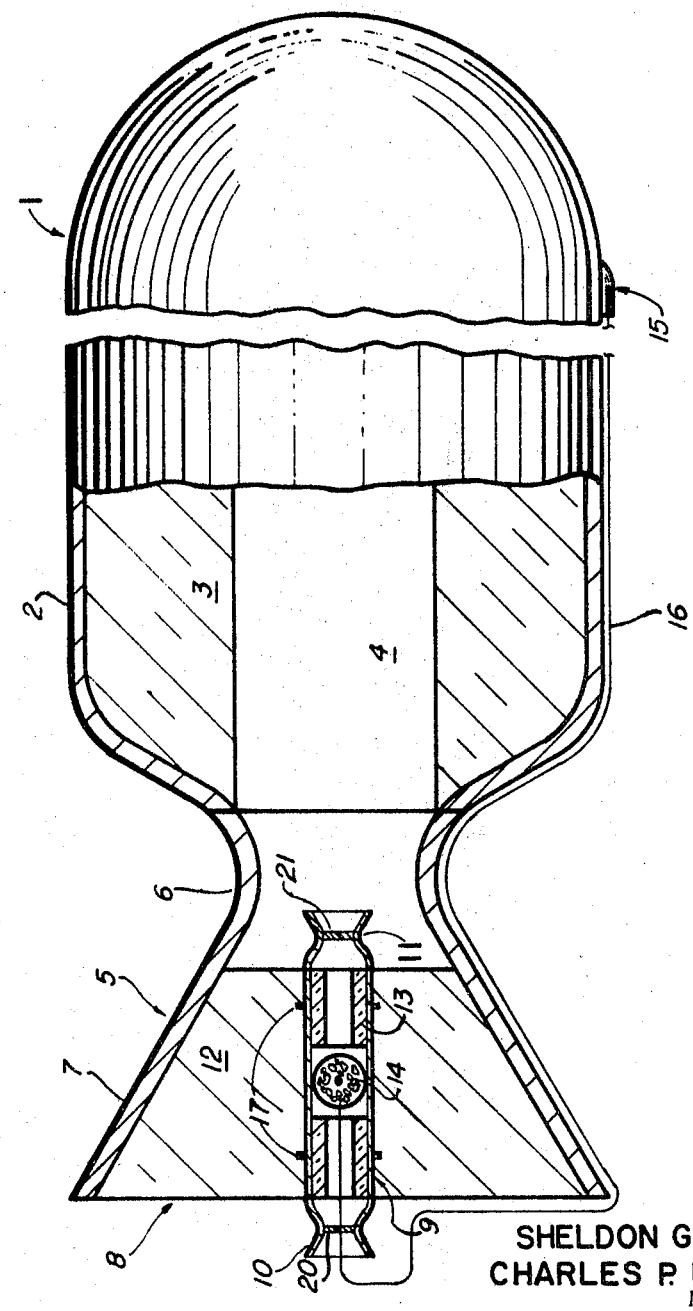
SHELDON G. ELLIS
CHARLES P. HARRIS
INVENTORS.
BY
ATTORNEY

3,461,672
AFT END IGNITER
Charles P. Harris, Huntsville, Ala., and Sheldon G. Ellis, Santa Clara, Calif., assignors to United Aircraft Corporation, East Hartford, Conn., a corporation of Delaware
Filed Nov. 18, 1966, Ser. No. 595,438
Int. Cl. F2k 9/04
U.S. Cl. 60—256     3 Claims

ABSTRACT OF THE DISCLOSURE

An aft end igniter for a rocket motor comprising an igniter motor having oppositely directed nozzles mounted in the exit cone of a rocket motor with one of the nozzles directed to cause hot gases issuing therefrom to be directed through the throat of the nozzle into the combustion chamber. The relative sizes of the opposed nozzles can be adjusted to compensate for loads experienced by the igniter motor to maintain the igniter motor in position during ignition.

BACKGROUND OF THE INVENTION

This invention relates to ignition of solid propellant rocket motors and more particularly to an aft end igniter for air launched rocket motors.

Aft end ignition of solid propellant rocket motors possesses certain known advantages over head end ignition. For example in aft end ignition the ignition system is jettisoned after ignition thereby improving the mass fraction and performance of the rocket and the case fabrication is simplified by elimination of the igniter mounting bosses in the forward end. In addition aft ignition is reliable, produces smooth and reproducible characteristics and, by proper design, ignition peaks can be maintained below operating pressure.

These advantages are achieved in first stage engines by using pad mounted igniters, but in upper stage motors, where the performance increase is most marked, many difficulties are encountered with aft end igniters.

An igniter is basically a rocket motor which generates a certain amount of thrust during ignition and means must be provided for keeping the igniter in place until ignition is accomplished. Since the igniter is firing into the nozzle throat the igniter must either be mounted on the nozzle exit cone or on a preceding stage. In the first case the nozzle must be strengthened to withstand the igniter thrust and additional means must be provided for separating the igniter after ignition. The added weight in most cases cancel out the weight advantage of aft end ignition.

In the second case the igniter must be fired at some time prior to separation and the close interrelationship of the ignition and separation function is not conducive to lightweight reliable systems.

It is accordingly an object of this invention to provide an aft end igniter which can be used without additional strengthening of the nozzle exit cone. It is another object of this invention to provide a simple lightweight ignition system for solid propellant rocket motors.

These and other objects of this invention will be readily apparent from the following description with reference to the accompanying drawings wherein:

The figure is a schematic view partly in section of an ignition system according to this invention.

DESCRIPTION OF THE INVENTION

A solid propellant rocket motor 1 comprises a casing 2 containing a solid propellant grain 3 having a port 4 extending along the length thereof. A nozzle 5 is affixed to casing 2, having a throat portion 6 and an exit cone 7. The igniter assembly shown generally as 8 consists of an igniter 9 in the form of a motor having opposed nozzles 10 and 11, which may be sealed with burst discs 20 and 21, and mounting means 12. The igniter contains igniter fuel grains 13 and ignition squib 14 which is an electrically operated pyrotechnic device as is well known in the art. The ignition squib is connected to the command and guidance section 15 of the rocket by means of cable 16 passing through and sealed to burst disc 20 so that igniter 9 may be ignited when desired. Support means 12 comprises in its simplest form a conical plug having a central aperture receiving igniter 9. Plug 12 is adhesively bonded to the interior of exit cone 7. The strength of the bond is selected such that it is strong enough to withstand the acceleration loads encountered but will fail at the pressure differential encountered when the pressure within rocket motor 1 reaches the design pressure. The plug can also be bonded to igniter 9 or igniter 9 may be provided with external ribs 17 around which plug 12 may be cast.

While the material from which support means 12 is fabricated is not critical, it is preferable to use a lightweight rigid material such as for example polystyrene foam or polyurethane foam.

The opposing nozzles 10 and 11 may be of the same size producing equal thrust or may be disproportioned such that one nozzle produces more thrust than the other. In general, for a given set of conditions, the larger nozzle 11 is with respect to nozzle 10, the greater the load placed on support means 12.

It is preferable to employ a plug as the support means 12 since it performs additional functions of acting as an environmental seal for the interior of motor 1 and of preventing the escape of ignition gases. However, other removable support means in the form of spiders, for example, could be employed which may either be adhesively bonded or connected to the exit cone by fusible, explosive or otherwise releaseable members.

In operation squib 14 is ignited by an appropriate signal from control system 15. The combustion products from squib 14 ignites grains 13. The pressure increase bursts discs 20 and 21 causing combustion products to be expelled through nozzles 10 and 11. The combustion gas exiting through nozzle 11 in turn ignites grain 3. Pressure builds up within motor 1 until design pressure is reached at which point support means 12 is expelled from the exit cone 7.

This invention has been described with respect to a specific embodiment thereof. It is obvious that various modifications of this invention can be made without departing from the scope of this invention which is limited only by the following claims wherein we claim:

1. In combination with a rocket motor comprising a combustion chamber, a burnable propellant in said combustion chamber and thrust producing nozzle means at the aft end of said combustion chamber, said nozzle means comprising a convergent throat portion and a divergent exit cone downstream from said throat portion; improved aft end igniter means comprising:
(a) an igniter motor for generating hot combustion gases, said igniter motor having oppositely directed nozzles whereby the total thrust produced by said igniter motor can be at least partially neutralized, and (b) support means releasably connecting said igniter motor to said exit cone and supporting said igniter motor in said exit cone with one of said opposed nozzles being oriented to direct hot combustion gases through said convergent throat portion into said combustion chamber.

2. The combination of claim 1 wherein said support means comprises a plug member surrounding said igniter motor and releasably attached to said exit cone.

3. The combination of claim 1, wherein said igniter motor is supported with all portions thereof located aft of said throat portion.

References Cited
UNITED STATES PATENTS

| | | | |
|---|---|---|---|
| 2,613,497 | 10/1952 | MacDonald | 60—229 |
| 2,720,749 | 10/1955 | Beebe | 60—256 |
| 2,776,623 | 1/1957 | Bonner | 60—256 |
| 3,104,523 | 9/1963 | O'Donnell | 60—256 |
| 3,112,669 | 12/1963 | Damblanc | 102—49.3 XR |
| 3,270,668 | 9/1966 | Silver | 60—256 XR |
| 3,340,691 | 9/1967 | Mangum | 60—250 |

CARLTON R. CROYLE, Primary Examiner

U.S. Cl. X.R.

102—49.7